United States Patent [19]

Sinelnikov et al.

[11] 4,182,358
[45] Jan. 8, 1980

[54] SYSTEM FOR LIMITING RATE OF PRESSURE RISE IN PIPELINE DURING HYDRAULIC IMPACT

[75] Inventors: Alexandr V. Sinelnikov; Raisa S. Patushinskaya; Lazar I. Freidgeim; Anatoly A. Bizev; Larisa M. Druzhkova; Vyacheslav K. Salimov, all of Moscow; Sergei P. Lebedich, Bugulma; Sergei L. Lvov, Moscow; Margarita E. Minkina, Moscow; Alexandr P. Shurygin, Moscow; Valery S. Levin, Moscow; Solmaz A. Faradzh-Zade, Moscow, all of U.S.S.R.; Igor V. Lebedev, deceased, late of Moscow, U.S.S.R., by Anna S. Izbash, Marina I. Lebedeva, administrators; by Marina I. Lebedeva, administrator, Moscow, U.S.S.R.

[73] Assignee: Vsesojuzny Nauchno-Issledovatelsky Institut Komplexnoi Avtomatizatsii Neftyanoi I Gazovoi Promyshlennosti, Moscow, U.S.S.R.

[21] Appl. No.: 704,176

[22] Filed: Jul. 12, 1976

[51] Int. Cl.² ............................................. G05D 11/02
[52] U.S. Cl. .................................... 137/115; 137/207; 137/568

[58] Field of Search ......................... 137/115, 207, 568

[56] References Cited

U.S. PATENT DOCUMENTS

| 1,937,149 | 11/1933 | Holveck | 137/568 X |
| 3,002,521 | 10/1961 | Greenlees et al. | 137/115 |
| 3,050,079 | 8/1962 | Tognella | 137/568 |
| 3,114,414 | 12/1963 | Judd | 137/207 X |
| 3,272,470 | 9/1966 | Bryant | 137/494 X |
| 3,347,256 | 10/1967 | Massey et al. | 137/115 |
| 3,911,941 | 10/1975 | Gerbic et al. | 137/116 |

FOREIGN PATENT DOCUMENTS

| 2272325 | 3/1975 | France | 137/115 |
| 376763 | 4/1973 | U.S.S.R. | |
| 508229 | 3/1976 | U.S.S.R. | |

Primary Examiner—Irwin C. Cohen
Attorney, Agent, or Firm—Lackenbach, Lilling & Siegel

[57] ABSTRACT

The system for limiting the rate of pressure rise in a pipeline during a hydraulic impact comprises a jet valve installed in the pipeline, an additional outlet of said valve being connected with a non-pressure dump tank via an actuator, and a pressuretight pneumatic compensator connected with the jet valve and, via a pressure transmitter, with a rate of pressure rise signal indicator whose outlet is connected with the membrane drive of the actuator.

6 Claims, 3 Drawing Figures

SYSTEM FOR LIMITING RATE OF PRESSURE RISE IN PIPELINE DURING HYDRAULIC IMPACT

The present invention relates to means for protecting pipelines against damage caused by hydraulic impacts originating on disconnection of pumping plants and, more particularly, it relates to systems for limiting the rate of the pressure rise in pipelines during a hydraulic impact.

Hydraulic impacts are one of the main causes of piperline ruptures which causes industry to incur heavy losses.

Long pipelines are protected against damage by a number of devices aimed at smoothing down the frontage of the impact wave.

The greatest recognition among these devices has been won by safety valves of various designs, which operate during a pressure rise in the pipeline and discharge the fluid into a dump tank.

There are, for example, spring-type safety valves installed on a branch of the pipeline and operated directly by the force of the impact wave.

The spring-type safety valve incorporates a body with a drain hole and a piston with a spring accommodated in said body. The moving piston opens the drain hole in the body thus connecting the pipeline through said hole with the drainage line.

At the moment of hydraulic impact the valve opens in a sufficiently short time and discharges the fluid into the non-pressure tank. The operating limit of the valves can be set by changing the tension of the spring.

An analysis of the operation of the spring-type safety valves has revealed that they are inadequately reliable. Some of the basic reasons of this inadequacy are their inertia and changes in the operating pressure caused by the inconstancy of the spring resilience.

Known in the prior art are systems manufactured by "Gulde," Federal Republic of Germany See U.S.S.R. Pat. No. 508,229) and "Grove," USA, (See U.S. Pat. No. 3,272,470) for smoothing down the impact wave in pipelines.

The protection system "Gulde" manufactured in the Federal Republic of Germany comprises a valve, a pneumatic control unit with replaceable flow restrictors, and a gradient regulator connected in series with the valve. The valve opens on a signal from the pneumatic control unit. This signal is initiated in accordance with the rate of pressure rise in the pipeline, said rate being determined by one of the replaceable flow restrictors.

The gradient regulator operates when the present rate of pressure rise is not equal to the actual rate of pressure rise in the pipeline.

As the valve opens, the working fluid is discharged into a dump tank thus smoothing down the frontage of the impact wave.

A disadvantage of the system produced by "Gulde" is the low reliability of the valve being that fails to close tightly and causes leakage of the working fluid. This results in considerable losses of the working fluid.

Besides, the pneumatic control unit is extremely complicated in design and difficult to operate.

The protection system developed by "Grove," USA, incorporates a "Flexflo" valve installed in thepipeline and a control unit connected with the "Flexflo" valve and comprising a series-connected electronic rate of pressure rise regulator, a hydraulic follow-up system, an air tank and flow restrictors functioning as a delay unit.

The "Flexflo" valve comprises a perforated cylinder embraced by a rubber cup. The space after the cylinder communicates with the pipeline so that the pressure existing during steady operation and acting on the inside space of the rubber cup is counerbalanced by the pressure applied to its external walls.

At the moment of hydraulic impact the pressure in the valve spaces is equalized within a certain period of time owing to the delay unit. Within this period of time the cup is forced away from the cylinder and the pipeline is put in communication with the dump tank.

As a result, at the moment of hydraulic impact the working fluid flows from the valve into the dump tank thus smoothing down the impact wave.

A disadvantage of this system resides in the low reliability of the rubber cup in the "Flexflo" valve, its rapid wear and the need caused by this wear in resetting the air tank and flow restrictor.

The control unit is very difficult to operate.

Also known in the art is a system for limiting the rate of pressure rise in a pipeline during a hydraulic impact comprising a jet valve installed directly in the pipeline and having an inlet, an outlet and an additional outlet connected with a non-pressure dump tank through an actuating mechanism; a rate of pressure rise indicator; and a pressure transmitter whose outlet is connected with the inlet of the rate of pressure rise indicator.

The known system functions as follows.

During a low rate of pressure changes in the pipeline during steady operation of said pipeline, the working fluid flows through the jet valve and enters the pipeline.

As the rate of pressure changes increases due to a hydraulic impact the rate of pressure rise indicator is actuated. A signal is sent to the control inlet of the jet valve and the flow of the working fluid is directed through said jet valve into the dump tank. This reduces the rate of pressure rise.

As the rate of pressure rise drops back to the preset limit in the signal indicator, a signal is sent to the control inlet of the jet valve and the flow of the working fluid is directed back into the pipeline. The system is sufficiently reliable.

A disadvantage of this system of pipeline protection against hydraulic impact lies in the heavy losses of energy in the jet valve caused by the necessity of converting in it the potential energy of the working fluid into the kinetic energy and then reconverting the kinetic energy back to potential energy.

Besides, during pressure fluctuations in the pipeline a part of the working fluid is discharged from the pipeline which interferes with the normal operation of the pipeline. This limits the functional capabilities of the system.

The main object of the invention resides in providing a system for limiting the rate of pressure rise in pipelines during a hydraulic impact which would reduce the hydraulic energy losses, widen the functional capabilities of the system and ensure reliable smoothing of the impact wave frontage.

The essence of the invention resides in providing a system for limiting the rate of pressure rise in a pipeline comprising a jet valve installed directly in the pipeline and having an inlet, and outlet and an additional outlet connected with a non-pressure dump tank via an actuating mechanism; a rate of pressure rise indicator; and a pressure transmitter whose outlet is connected with the inlet of the rate of pressure rise indicator. According to the invention, there is a pressuretight pneumatic compensator connected with the additional outlet of the jet valve, which is intended to reduce the rate of pressure rise in the pipeline, said compensator being connected via the pressure transmitter with the rate of pressure rise signal indicator whose outlet is connected with the membrane drive of the actuating mechanism.

It is practicable that the jet valve should be made in the form of a coaxially-arranged nozzle, diffuser and internozzle chamber which is directly connected with the pressuretight compensator.

It is preferable that the system should comprise a logical unit and a transmitter showing the fluid level in the pneumatic compensator, whose two outlets should be connected with the pressuretight compensator and whose third outlet should be connected via a position regulator with one inlet of the logical unit, the second inlet of the logical unit should be connected with the outlet of the rate of pressure rise indicator and the third inlet should be connected via another position regulator with another pressure transmitter installed in the pipeline. It is desirable that the pressuretight compensator should be connected with an air supply line via another actuating mechanism whose membrane drive should be connected with the outlet of the logical unit.

It is likewise practicable that the rate of pressure rise signal indicator should comprise a series-connected indicator setting element, control pulse shaper, a comparison unit and a delay unit. The delay unit incorporates an air tank connected in parallel with the comparison unit and a variable flow restrictor connected to the outlet of the comparison unit and communicating with the atmosphere.

The introduction of the pressuretight compensator, the logical unit, and the new connections of the jet valve with the pneumatic compensator and the discharge line make it possible during steady working conditions to avoid conversion of the entire potential energy of the working fluid flow into kinetic energy due to the presence of pressure in the internozzle chamber.

In this case only a part of the potential energy of the fluid flow is converted into kinetic energy, said potential energy being determined by the difference of the fluid velocities in the pipeline and in the internozzle chamber of the jet valve. This reduces considerably the energy losses. The connections of the indicator with the actuating mechanism and the pneumatic compensator ensure a substantial decrease in the rate of the pressure rise in the pipeline during a hydraulic impact and coordination of functioning of all the units of the system according to the invention. This widens the functional capabilities of the system and makes it versatile.

Now the invention will be described in detail by way of example with reference to the accompanying drawings in which.

Figure 1:
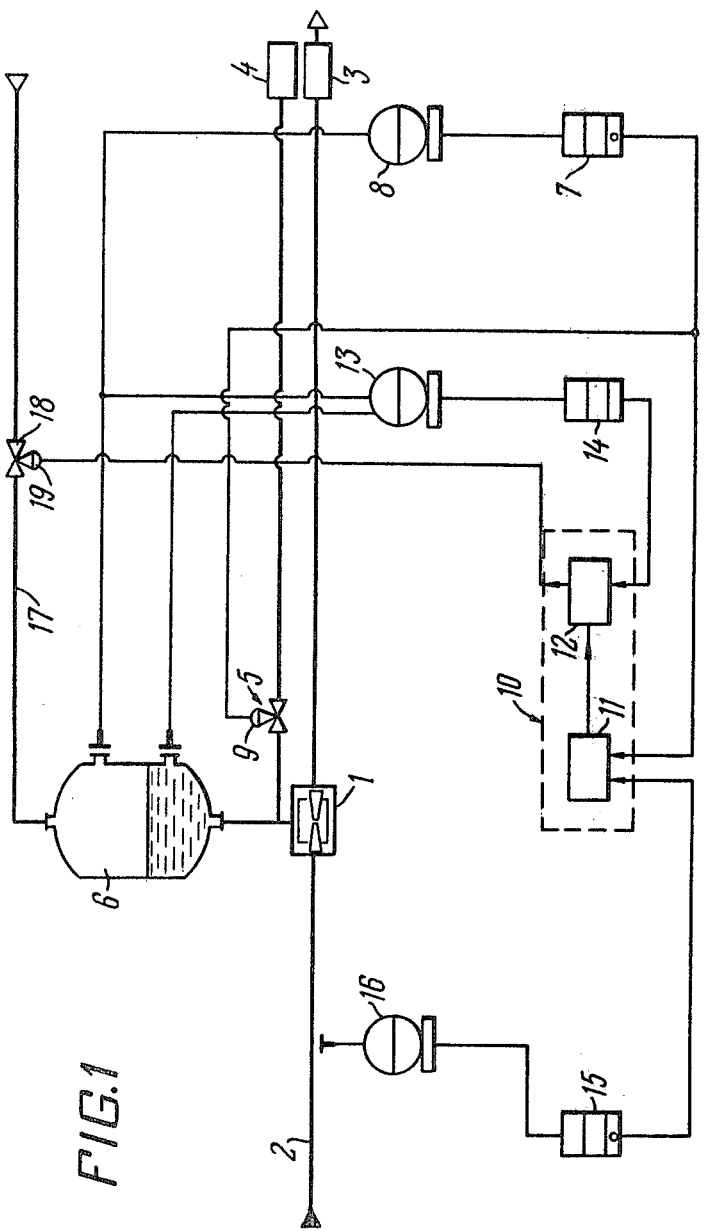
FIG. 1 is a flow diagram of the system for limiting the rate of pressure rise in a pipeline during a hydraulic impact, according to the invention.

The system for limiting the rate of pressure rise in a pipeline during a hydraulic impact comprises a jet valve 1 (FIG. 1) installed directly in the pipeline 2 on the suction line of a pumping plant 3. The jet valve 1 has an inlet, an outlet and an additional outlet connected with a non-pressure dump tank 4 via actuator controlled valve or an an actuator 5.

According to the invention, the system incorporates a pressuretight pneumatic compensator 6 connected with the additional outlet of the jet valve 1.

The system also comprises a rate of pressure rise signal indicator 7 and a pressure transmitter 8 whose outlet is connected with the inlet of the rate of pressure rise signal indicator 7.

The pressuretight pneumatic compensator 6 is connected via the pressure transmitter 8 with the rate of pressure rise indicator 7 whose outlet is connected to the membrane drive 9 of the actuator 5.

The system also comprises a logical unit 10 consisting of an "OR" element 11, a "AND" element 12 and a transmitter 13 showing the fluid level in the pressuretight pneumatic compensator 6. Two outlets of the transmitter 13 are connected with the pressuretight pneumatic compensator 6 and the third outlet is connected via a position regulator 14 with a first inlet of the logical unit 10. A second inlet of the logical unit 10 is connected with the outlet of the rate of pressure rise signal indicator 7 and a third inlet is connected via a position regulator 15 with another pressure transmitter 16 installed in the pipeline 2.

The pressuretight pneumatic compensator 6 is connected with an air supply line 17 via another actuating mechanism or an actuator controlled valve 18 whose membrane drive 19 is connected with an outlet of the logical unit 10.

Figure 2:
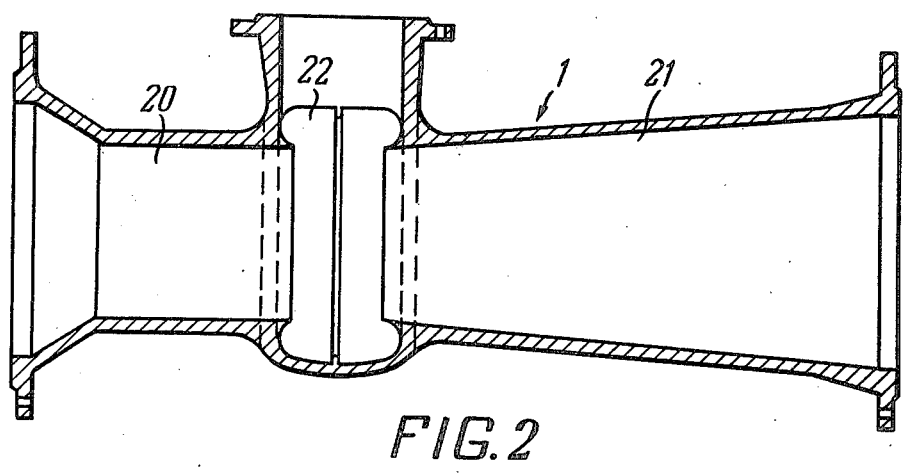
FIG. 2 is an enlarged, longitudinal, cross sectional view of a jet valve according to the invention.

According to the invention, the jet valve 1 (FIG. 2) is made of a nozzle 20 and a diffuser 21 coaxially arranged, and an internozzle chamber 22 which is directly connected with the pressuretight pneumatic compensator 6.

Figure 3:
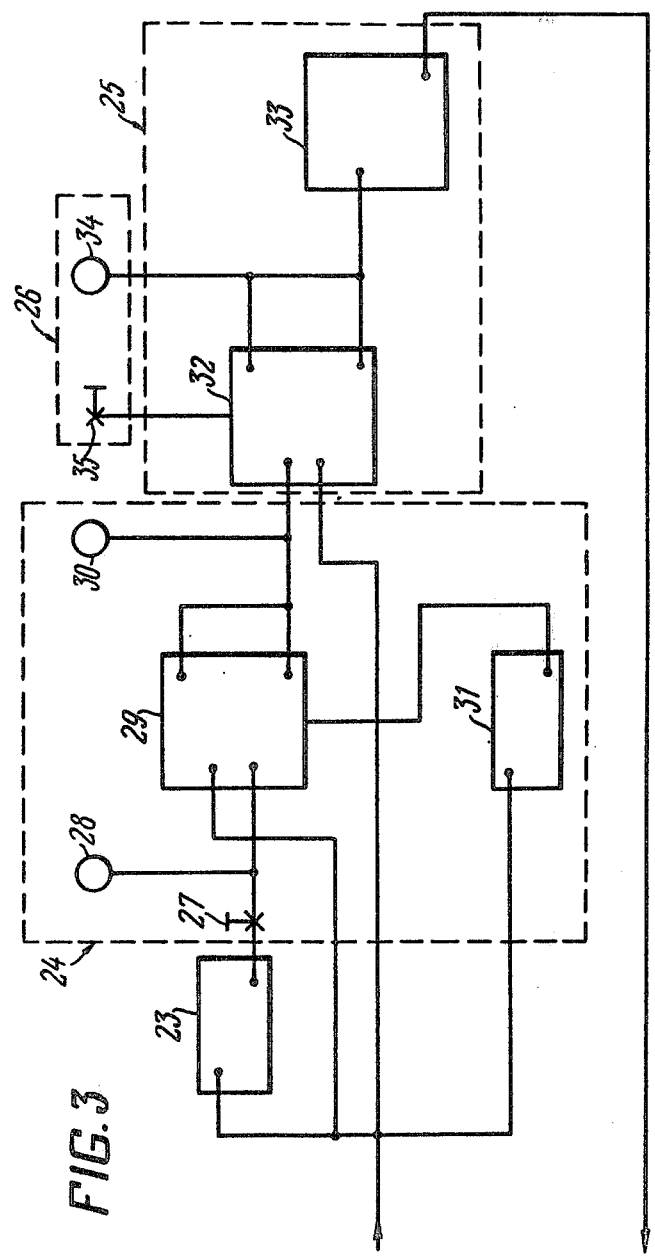
FIG. 3 is a flow diagram of the rate of pressure rise signal indicator according to the invention.

The rate of pressure rise signal indicator 7 comprises an indicator initial setting element 23 (FIG. 3), a control pulse shaper 24 and a comparison unit 25 connected in series.

The element 23 is set so as to pass the control signal to the outlet of the control pulse shaper 24 during steady operating conditions of the pipeline 2.

The rate of pressure rise signal indicator 7 also comprises an output signal reset delay unit 26.

The element 23 for initial setting of the signal indicator 7 is a signal shift repeater (see T. K. Berends, T. K. Efremova, A. A. Tagayevskaya "Elements and diagrams of Pneumatic Automation", Machinostroyeniye, Moscow 1968).

The control pulse shaper 24 comprises a variable flow restrictor 27, an air tank 28, a comparison element 29 and an air tank 30 consecutively connected. The shaper 24 also comprises a shift repeater 31 connected in parallel with the element 29.

The comparison unit 25 comprises a comparison element 32 and a repeater-power amplifier 33 connected in series.

The unit 26 comprises an air tank 34 connected in parallel with the comparison unit 25, and a variable flow restrictor 35 connected to the outlet of the comparison unit 25 which communicates with the atmosphere. The supply of the units of the signal indicator 7 is not shown in FIG. 3.

The system for limiting the rate of pressure rise in a pipeline during a hydraulic impact functions as follows.

During steady operating conditions of the pipeline 2 (FIG. 1) the jet valve 1 and the pnuematic compensator 6 are in dynamic equilibrium.

The working fluid flows through the pipeline 2 from the nozzle 20 (FIG. 2) through the internozzle chamber 22 into the diffuser 21.

During low pressure fluctuations in the pipeline 2 the working fluid flows through the internozzle chamber 22 into the pneumatic compensator 6 (FIG. 1) due to the pressure difference between the pressure of the air cusion in the pneumatic compensator 6 and in the pipeline 2 which smoothes down the fluctuations of the fluid pressure in the pipeline 2 and thus brings about steady operating conditions in said pipeline 2.

When the pumping plant 3 is disconnected, a wave of fluid at a higher pressure is propagated against the flow through the pipeline 2. When said wave passes through the jet valve 1, the working fluid is discharged through the internozzle chamber 22 (FIG. 2) of the jet valve 1 (FIG. 1) into the pneumatic compensator 6. As a result, the rate of pressure rise of the working fluid is diminished.

Inasmuch as the volume of the pneumatic compensator 6 is limited, in case of great disturbances in the fluid pressure in the pipeline 2, said fluid is discharged into the non-pressure dump tank 4 through the actuating mechanism 5.

Detection of dangerous disturbances of fluid pressure in the pipeline 2 is carried out by the signal indicator 7 via the pressure transmitter 8 connected with the pneumatic compensator 6.

The value of the impact wave, which the rate of pressure rise indicator 7 monitors, is determined by the working conditions of the pipeline 2. If within a preset time the amplitude of pressure the rise of the working fluid exceeds the limit set by the signal indicator 7, the indicator 7 sends a signal to the logical unit 10 and, simultaneously, to the actuator 5. The actuator 5 opens and the fluid is discharged into the container 4. Operation of the logical unit 10 will be described below.

Operation of the protection system may be accompanied by leaks of air from the pneumatic compensator 6. Periodical feeding of the pneumatic compensator 6 with air is effected automatically. The level of the working fluid in the pneumatic compensator 6 is checked by a transmitter 13 connected with the position regulator 14 having an adjustable dead zone. A considerable reduction of the air volume in the pneumatic compensator 6 is registered by the level transmitter 13. If the signal sent from the level transmitter 13 to the regulator 14 exceeds the value of pressure set by the pressure regulator 14, the regulator 14 will send a signal to the logical unit 10. From the logical unit 10 the corresponding signal reaches the actuating mechanism 18 which opens and allows the pneumatic compensator 6 to be filled with air until the level of the working fluid in the pneumatic compensator 6 drops to the value preset by the regulator 14.

Upon reaching the pressure set value of the regulator 14, the output signal of the regulator 14 will be equal to zero and the actuating mechanism 18 will close. The air pressure of air for feeding the pneumatic compensator 6 must exceed the maximum working pressure in the pipeline 2.

To prevent the working fluid from penetrating into the line for feeding the pneumatic compensator 6 with air, and to avoid false operation of the feeding system on changes of the fluid level in the pneumatic compensator 6 at the moment of hydraulic impact, the system has a provision for interlocking the opening of the other actuator 18. Interlocking is effected with the aid of the logical unit 10 which utilizes the "OR" element 11 and "AND" element 12 to prevent the passage of the signal from the regulator 14 in case of a pressure rise during transient or steady working conditions of the pipeline 2. For this purpose the control input of the "AND" element 12 receives signal via the "OR" element 11 from the outlets of the rate indicator 7 and the position regulator 15 connected with the pressure transmitter 16 mounted on the pipeline 2.

The pressure transmitter 16 registers pressure in the pipeline 2 and transmits the corresponding signal to the position regulator 15, where the pressure of the fluid in the pipeline 2 is compared with the pressure preset in the position regulator 15.

The preset pressure of the position regulator 15 excedes the working pressure during steady working conditions of the pipeline 2.

When the fluid pressure exceeds the pressure set by the position regulator 15, a signal is sent to the "OR" element 11 of the logical unit 10.

Then the signal passes through the "AND" element 12 of the logica unit 10 to the actuator 18. Under the effect of this signal the actuator 18 closes and shuts off the air supply of air into the pneumatic compensator 6.

Now, consider in detail the functioning of the signal indicator 7. The signal from the pressure transmitter 8 is received at the input of the indicator 7. The output signal of the indicator 7 is transmitted to the "OR" element 11 of the logical unit 10 and to the membrane drive 9 of the actuating mechanism 5.

During steady operating conditions of the pipeline 2 the pressure fluctuations of the working fluid in the pipeline 2, the pressure fluctuations of air in the pneumatic compensator 6 and, correspondingly, fluctuations of the input signal of the signal indicator 7 are within the permissible limits of pressure and rate of pressure changes of the working fluid. The air pressure at the outlet of the shaper 24 (FIG. 3) corresponds to the input pressure of the signal indicator 7, always exceeding it by a certain value set by the repeater 31.

The setting of the element 31 ensures filtration of the highfrequency changes in the pressure of the working fluid in the pipeline 2 and of the air cushion of the pneumatic compensator 6, the characteristics of said changes not being dangerous to the pipeline 2.

Then the input signal of the indicator 7 and the output signal of the shaper 24 are compared by the element 32 of the comparison unit 25.

The element 32 operates, producing a zero signal at its output and, correspondingly, at the outlet of the indicator 7. The output signal of the indicator 7 exerts no influence on the connected elements of the system according to the invention, so that the actuators 5 (FIG. 1) and 18 remain closed. As a result, the working fluid is not discharged into the non-pressure dump tank 4 and the pneumatic compensator 6 is not fed additionally with air.

With a considerable short-term change in the pressure of the working fluid in the pipeline 2, part of the working fluid passes through the jet valve 1 into the pneumatic compensator 6 which raises sharply the pressure of the air cushion in the pneumatic compensator 6.

This change in the pressure of the air cushion is registered by the pressure transmitter 8 and a corresponding signal is sent from its output to the inlet of the signal indicator 7. If this pressure change exceeds the value set by the element 23 (FIG. 3), the element 29 of the shaper 24 operates and the air pressure at the output of the shaper 24 remains memorized within the time set by the variable flow restrictor 27 and air tank 28. The output signal of the element 32 of the comparison unit 25 and, consequently, the output signal of the indicator 7 remain equal to zero.

If the pressure change in the pipeline 2 and in the air cushion are considerable and prolonged, the element 32 of the comparison unit 25 operates and the output signal at the output of the element 32 and, consequently, of the indicator 7 becomes equal to unity.

The term "considerable pressure change" should be understood as a pressure change exceeding the pressure set by the element 31.

The output signal of the signal indicator 7 equal to unity acts on the membrane drive 9 (FIG. 1) of the actuating mechanism 5 and opens it. As a result, part of the working fluid is discharged from the pipeline 2 through the actuating mechanism 5 into the non-pressure dump tank 4 so that the pressure in the pipeline 2 drops to the pressure prevailing during steady operating conditions of the pipeline 2.

In addition, the output signal of the signal indicator 7 equal to unity acts via the "OR" element 11 of the logical unit 10 on the membrane drive 19 of the actuating mechanism 18 and closes it. As a result, the pneumatic compensator 6 is not fed additionally with air.

The unit 26 is intended to change the speed at which the output signal of the signal indicator 7 is transformed from unity to zero. This is required in order to delay the closing of the actuator 5 since sharp closing of said mechanism causes an additional hydraulic impact.

The employment of the system according to the invention improves the reliability of protecting the pipeline against rupture during hydraulic impacts with minimum pressure losses during steady operating conditions of the pipeline.

What is claimed is:

1. A system for limiting the rate of pressure rise in a pipeline during a hydraulic impact comprising a non-pressure dump tank; a first actuator controlled valve having a membrane drive; a jet valve installed directly in said pipeline and having an inlet, a first outlet and a second outlet, said second outlet of said jet valve being connected to said non-pressure dump tank via said first actuator controlled valve; a rate of pressure rise signal indicator having an inlet and an outlet, said outlet of said rate of pressure rise signal indicator being connected with said first actuator controlled valve; a first pressure transmitter having an inlet and an outlet, said outlet of said pressure transmitter being connected with said inlet of said rate of pressure rise indicator; and pressure-tight pneumatic compensator means for reducing the rate of the pressure rise in the pipeline by lifting therein the working fluid during the hydraulic impact and by compression of the air cushion in the compensator above the fluid level, said pressure-tight pneumatic compensator means being connected to said second outlet of said jet valve and, via said first pressure transmitter, to said rate of pressure rise indicator; a logical unit having inlets and an outlet; a first position regulator; a second position regulator; a second pressure transmitter installed in said pipeline and connected with said second position regulator; an air supply line having a second actuator controlled valve with a membrane drive, said pressure-tight pneumatic compensator means being connected with said air supply line through said second actuator controlled valve, said membrane drive of said second actuator controlled valve being connected with said outlet of said logical unit; a third pressure transmitter showing the fluid level in said pressure-tight pneumatic compensator means and having three outlets, two outlets of said third pressure transmitter being connected with said pressure-tight pneumatic compensator means and a third outlet of said third pressure transmitter being connected via said first position regulator with a first inlet of said logical unit; a second inlet of said logical unit being connected to said outlet of said rate of pressure rise signal indicator; a third inlet of said logical unit being connected via said second position regulator to said second pressure transmitter.

2. A system for limiting the rate of pressure rise in a pipeline during a hydraulic impact according to claim 1 wherein the jet valve is made of a nozzle, a diffuser and an internozzle chamber coaxially arranged, said internozzle chamber being directly connected with said second outlet of said jet valve.

3. A system for limiting the rate of pressure rise in a pipeline during a hydraulic impact according to claim 1 wherein said rate of pressure rise signal indicator comprises the following elements connected in series: an element for initial setting of the indicator, a control pulse shaper, and a comparison unit; a delay unit comprising an air tank connected in parallel with said comparison unit and a variable flow restrictor connected to the outlet of said comparison unit which communicates with the atmosphere.

4. A system for limiting the rate of pressure rise in a pipeline during a hydraulic impact according to claim 2 wherein said rate of pressure rise signal indicator comprises the following elements connected in series: an element for initial setting of the indicator, a control pulse shaper, and a comparison unit; a delay unit comprising an air tank connected in parallel with said comparison unit and a variable flow restrictor connected to the outlet of said comparison unit which communicates with the atmosphere.

5. A system for limiting the rate of pressure rise in a pipeline during a hydraulic impact according to claim 1, wherein said logical unit comprises: an OR element having a first input, a second input and an output, said first input being connected to said second input of said logical unit and said second input being connected to said third input of said logical unit; and an AND element having a first input, a second input and an output, said first input being connected to said output of said OR element, said second input being connected to said first input of said logical unit and said output being connected to said outlet of said logical unit.

6. A system for limiting the rate of pressure rise in a pipeline during a hydraulic impact according to claim 2, wherein said logical unit comprises: an OR element having a first input, a second input and an output, said first input being connected to said second input of said logical unit and said second input being connected to said third input of said logical unit; and an AND element having a first input, a second input and an output, said first input being connected to said output of said OR element, said second input being connected to said first input of said logical unit and said output being connected to said outlet of said logical unit.

* * * * *